US012426628B2

(12) United States Patent
Fraser et al.

(10) Patent No.: US 12,426,628 B2
(45) Date of Patent: Sep. 30, 2025

(54) HEATER ASSEMBLY

(71) Applicant: JT International SA, Geneva (CH)

(72) Inventors: Nelson Kevin Fraser, London (GB); Akihiko Suzuki, Tokyo (JP); Glenn Harrison, Andover (GB); Eduardo Jose Garcia Garcia, Grand-Saconnex (CH); Manabu Yamada, Tokyo (JP)

(73) Assignee: JT International SA (CH)

( * ) Notice: Subject to any disclaimer, the term of this patent is extended or adjusted under 35 U.S.C. 154(b) by 347 days.

(21) Appl. No.: 17/802,371

(22) PCT Filed: Feb. 25, 2021

(86) PCT No.: PCT/EP2021/054755

§ 371 (c)(1),
(2) Date: Aug. 25, 2022

(87) PCT Pub. No.: WO2021/170758

PCT Pub. Date: Sep. 2, 2021

(65) Prior Publication Data

US 2023/0078670 A1 Mar. 16, 2023

(30) Foreign Application Priority Data

Feb. 25, 2020 (EP) .................................... 20159389

(51) Int. Cl.
*A24F 40/20* (2020.01)
*A24F 40/46* (2020.01)
(Continued)

(52) U.S. Cl.
CPC .............. *A24F 40/20* (2020.01); *A24F 40/46* (2020.01); *A24F 40/57* (2020.01); *H05B 3/04* (2013.01);
(Continued)

(58) Field of Classification Search
CPC .......... A24F 40/46; A24F 40/42; A24F 40/40; A24F 40/00; A24F 40/10; A24F 40/20
See application file for complete search history.

(56) References Cited

U.S. PATENT DOCUMENTS 6,054,690 A 4/2000 Petit et al.
2016/0295919 A1 10/2016 Thomas, Jr.
(Continued)

FOREIGN PATENT DOCUMENTS

CN 104799438 A 7/2015
CN 109619702 A 4/2019
(Continued)

OTHER PUBLICATIONS

International Search Report for Application No. PCT/EP2021/054755 mailed May 7, 2021, pp. 1-4.

*Primary Examiner* — Alex B Efta
(74) *Attorney, Agent, or Firm* — Lerner David LLP

(57) ABSTRACT

A heater assembly for an aerosol generating device includes a tubular heating chamber and a flexible thin film heater comprising a heating element track supported on a surface of a flexible electrically insulating backing film. The flexible thin film heater is wrapped around an outer surface of the heating chamber with the backing film toward the heating chamber. The invention further includes a temperature sensor comprising a temperature sensing element configured to sense a local temperature, wherein the temperature sensing element is positioned so as to overlap with a portion of heating element track. Because the temperature sensing element overlaps with a portion of the heating element track, the temperature sensor provides a more accurate reading of the temperature of the heating element itself.

14 Claims, 5 Drawing Sheets

(51) Int. Cl.

| | |
|---|---|
| ***A24F 40/57*** | (2020.01) |
| ***H05B 3/04*** | (2006.01) |
| ***H05B 3/42*** | (2006.01) |

(52) U.S. Cl.

CPC ......... *H05B 3/42* (2013.01); *H05B 2203/013* (2013.01); *H05B 2203/021* (2013.01); *H05B 2203/022* (2013.01)

(56) References Cited

U.S. PATENT DOCUMENTS

| | | | | |
|---|---|---|---|---|
| 2019/0364619 | A1 | 11/2019 | Schoenemann et al. | |
| 2020/0046028 | A1* | 2/2020 | Oh | H05B 3/46 |
| 2021/0378318 | A1* | 12/2021 | Reevell | A24F 40/57 |
| 2022/0408812 | A1* | 12/2022 | Lim | A24F 40/20 |

FOREIGN PATENT DOCUMENTS

| | | | |
|---|---|---|---|
| EP | 3573425 | A1 | 11/2019 |
| JP | H11-505060 | A | 5/1999 |
| WO | 2019148785 | A1 | 8/2019 |
| WO | 2019171331 | A2 | 9/2019 |

* cited by examiner

HEATER ASSEMBLY

CROSS-REFERENCE TO RELATED APPLICATIONS

The present application is a national phase entry under 35 U.S.C. § 371 of International Application No. PCT/EP2021/054755, filed on Feb. 25, 2021, published in English, which claims priority from European Application No. 20159389.4, filed on Feb. 25, 2020, the disclosures of which are incorporated herein by reference.

TECHNICAL FIELD

The present invention relates to a method of fabricating a heater assembly, more particularly a heater assembly for an aerosol generating device.

BACKGROUND

Thin film heaters are used for a wide range of applications which generally require a flexible, low profile heater which can conform to a surface or object to be heated. One such application is within the field of aerosol generating devices such as reduced risk nicotine delivery products, including e-cigarettes and tobacco vapour products. Such devices heat an aerosol generating substance within a heating chamber to produce a vapour. One means to heat the consumable is to use a heater assembly comprising a thin film heater which conforms to a surface of a heating chamber to ensure efficient heating of an aerosol-generating substance within the chamber.

Thin film heaters generally comprise a resistance heating element enclosed in a sealed envelope of flexible electrically insulating thin film with contact points to the heating element for connection to a power source. These conventional thin film heaters, formed of a planar heating element sealed within an insulating thin film envelope, must then be attached to a surface to be heated. In the context of aerosol generating devices, this involves attaching the thin film heater to the outer surface of a heating chamber to form a heater assembly so as to transfer heat to an aerosol generating consumable placed within the chamber.

Often the temperature of such thin film heaters needs to be carefully monitored when employed in a device, for example to provide feedback to control circuitry to adjust the heater to a required heating temperature or to prevent the heating temperature exceeding a selected maximum temperature. For example, in the case of a controlled temperature aerosol generating device, the temperature must be carefully monitored and controlled to maintain the temperature of the heating chamber within a prescribed operating window to deliver efficient vapour delivery, without exceeding a temperature at which a consumable might burn. One issue with known thin film heaters and heater assemblies is that conventional means for detecting the heating temperature lack the required level of accuracy and reliability. Known methods include mounting a temperature sensor within a thin film heater but the readout from such a temperature sensor will vary depending on the position in which it is placed. Furthermore the attaching of a heat sensor through known methods adds additional complexity to the assembly procedure and it is difficult to reproducibly position the temperature sensor in the same position across devices. This can result in differing heating performance between devices, since the measured temperature used to control the heater will vary depending on the specific location in which the sensor is positioned.

The present invention aims to make progress in addressing these issues to provide an improved heater assembly and method of fabricating a heater assembly.

SUMMARY OF THE INVENTION

According to a first aspect of the invention, there is provided a heater assembly for an aerosol generating device comprising: a tubular heating chamber; a flexible thin film heater comprising a heating element track supported on a surface of a flexible electrically insulating backing film; wherein the flexible thin film heater is wrapped around an outer surface of the heating chamber with the backing film toward the heating chamber; and a temperature sensor comprising a temperature sensing element configured to sense the local temperature, wherein the temperature sensing element is positioned so as to overlap with a portion of heating element track.

Because the temperature sensing element is configured to sense the local temperature and overlaps with a portion of the heating element track, the temperature sensor provides a more accurate reading of the temperature of the portion of the heating element itself, rather than measuring the temperature of the other components of the heater assembly, such as the film between the heating element track, or taking an average temperature across the heating area. Therefore the sensed temperature can be used to more precisely control the temperature of the heater assembly when employed in a device. Even if the temperature distribution across the heater assembly is non-uniform and some parts, for example parts of the film in the immediate vicinity of the heater track, are hotter than other parts, localised overheating is prevented as the temperature sensing element is arranged so as to detect the temperature of the hottest portions of the thin film heater. This arrangement allows for the temperature sensor to be consistently positioned relative to the heater track and therefore provides greater reproducibility in the heating performance between devices.

Preferably the phrase "positioned so as to overlap" requires that the temperature sensing element is positioned adjacent to a portion of the heating element track in a direction corresponding to a normal of the surface of the heating chamber or, equivalently, the temperature sensing element is positioned adjacent to a portion of the heating element track in the radial direction of the tubular heating chamber. In other words, when the flexible thin film heater is wrapped around the tubular heating chamber the temperature sensing element is held adjacent to a portion of the heating element track in a direction corresponding to a normal of the surface of the hearting chamber or a direction corresponding to the radial direction of the tubular heating chamber. In this way, the temperature sensing element provides a local measurement of the heating temperature at a point on the heater element track.

In particular, by positioning the temperature sensing element adjacent to a point on the heater element track, the temperature sensing element senses the temperature of a portion of the heater element track surrounding the specific point. As described above, by sensing the local temperature at a point on the heating element, a more accurate reading is achieved compared to devices which sense an average temperature over the heating element, for example by providing an extended temperature sensing element which is arranged over the heating area more generally.

The temperature sensor may be any known type of temperature sensor configured to sense the local temperature. Preferably the temperature sensor is configured to sense the temperature at a point such that it can provide a local temperature reading at the point. For example the temperature sensing element may comprise a temperature sensing head, for example a bead, such that it senses the temperature at the region local to the temperature sensing head. In this way a local, "point", reading is possible, providing advantages over prior art devices in which the temperature is sensed over a wider area. The the sensed temperature can be provided as a signal to a PCB to monitor and/or control the heater. For example the temperature sensor may incorporate one or more of: a thermistor, a thermocouple, a resistance thermometer, a silicon bandgap temperature sensor, an integrated circuit sensor.

The thin film heater is preferably a flexible planar thin film heater which is adapted to be wrapped around the tubular heating chamber. Preferably the thin film heater comprises a flexible planar heating element (i.e. the heating element is planar but flexible to allow wrapping of the thin film heater) comprising a heating element track which follows a circuitous path over a heating area within the plane of the heating element; and two contact legs for connection to a power source, the contact legs extending away from the heater track in the plane of the heating element. Preferably the heater track is configured to provide substantially uniform heating over the heating area. In this way, the temperature sensing element can be positioned so as to overlap with any portion of the heating element track (also referred to as "the heater track") and provide an accurate measurement of the temperature of the heater track as a whole. The heater track path may be a serpentine or meandering path over the heating area and the heater track may have a substantially uniform width and thickness.

Preferably the temperature sensing element is aligned with a longitudinal portion of the heating element track, that is, a portion of the heating element track which extends in a direction corresponding to the longitudinal axis of the heating chamber. Preferably the temperature sensing element is positioned so as to overlap with a portion of the heating element track which extends in a direction corresponding to the longitudinal axis of the heating element. In this way, small variations in the height of the positioned sensing element have no effect on the accuracy of the temperature reading as the sensing element will still be positioned overlapping with a portion of the heater track.

Preferably the temperature sensing element is held between the outer surface of the heating chamber and a portion of the heating element track. In this way, the temperature sensing element is positioned between the outer surface of the heating chamber and a portion of the heating track such that the temperature sensing element measures both the temperature of the heating track and that of the heating chamber. This arrangement also allows for the temperature sensing element to be secured by the flexible thin film heater when wrapped around the heating chamber.

Preferably the temperature sensor is positioned against the outer surface of the heating chamber and the flexible thin film heater is wrapped around the temperature sensor and the heating chamber.

Preferably the temperature sensing element is held in direct contact with the outer surface of the heating chamber. In this way the temperature sensing element measures the outer surface of the heating chamber directly. This also allows for the temperature sensor to be removed from the thin film heater and fixed directly to the surface of the heating chamber, which improves ease of manufacture and allows for more accurate positioning of the temperature sensing element than when it is incorporated within the film layers of the thin film heater.

Preferably the heating chamber comprises one or more indentations on an outer surface of the heating chamber and the temperature sensing element is positioned within an indentation. This protects the temperature sensing element from damage since it can lie at least partially within the indent with the thin film heater wrapped tightly around it. It further allows for a more accurate reading of the chamber temperature. Preferably the indentations are linear lengthwise indentations running along the length of the tubular heating chamber. Preferably the temperature sensing element is positioned at a central position along the lengthwise indentation.

Preferably the temperature sensor is fixed to the outer surface of the heating chamber with an adhesive. Preferably the adhesive is an inorganic adhesive, for example a silicone or ceramic glue. This allows the temperature sensor to be attached directly to the surface of the heating chamber in a straightforward assembly step. The adhesive is preferably chosen to withstand a temperature of about 300° C. without melting.

Preferably the temperature sensor is separated from the portion of heating element track by the backing film. In particular, one side of the backing film may be in direct contact with the temperature sensing element where the other side of the backing film supports the heater track. In this way, the tubular side wall of the chamber, the temperature sensing element, the backing film and a portion of the heater track are arranged sequentially in the radial direction of the tubular heating chamber. Preferably the flexible electrically insulating backing film has a thickness of less than 80 μm preferably less than 50 μm, and preferably a thickness of greater than 20 μm. In this way, the temperature sensing element can obtain an accurate reading of the heating temperature of the heater track.

In some examples, the temperature sensor may be in direct contact with the portion of the heating element track. Preferably, in such examples, the heater assembly further comprises an electrically insulating layer positioned between the surface of the heater chamber and the heater track such that the heater track is electrically isolated from the surface of the heating chamber. Preferably, the backing film comprises a hole or cut-out arranged in such a way to allow the temperature sensing element to contact the heater track directly. Preferably the temperature sensor further comprises connecting wires which are positioned between the electrically insulating layer and the backing film.

Preferably the thin film heater further comprises two contact legs for connection to a power source, the contact legs extending away from the heater track along the length of the heating chamber; and the temperature sensor comprises a temperature sensing element and elongated electrical connections, the elongated electrical connections oriented substantially in the same direction as the contact legs of the heating element. In this way connection of the heating element and the temperature sensor to the control circuitry of a device is facilitated and the contact legs and electrical connections may provide mutual support. Preferably the electrical connections of the temperature sensor extend away linearly from the temperature sensing head. In particular, preferably the electrical connections lie substantially in a plane with the temperature sensing head. Preferably the electrical connections of the temperature sensor do not pass through the electrically insulating backing film, thereby maintaining heat and electrical insulation. Preferably the electrical connections extend between (e.g. are held between) the electrically insulating backing film and the surface of the heating chamber and preferably emerge at an edge of the backing film.

Preferably the flexible electrically insulating backing film comprises Polyimide or PTFE. The backing film may comprise polyimide such as a polyimide film with a layer of Si adhesive. The backing film may alternatively or additionally comprise a fluoropolymer such as PTFE. When the backing film comprises a fluoropolymer it may comprise an at least partially defluorinated surface layer, formed for example by a surface treatment such as plasma and/or chemical etching. This allows for an adhesive to be applied to the treated surface which otherwise would not adhere given the extremely low friction surfaces provided by fluoropolymers. The backing film may additionally or alternatively comprise PEEK.

Preferably the flexible thin film heater further comprises a heat shrink layer positioned on the electrically insulating backing film so as to at least partially enclose the heating element track between the electrically insulating backing film and the heat shrink layer. In this way, the heat shrink film acts to both seal the heating element track between the heat shrink film and backing film and also acts to provide an attachment mechanism such that the thin film heater assembly can be attached to a heating chamber by heat shrinking. The heat shrink film may comprise one or more of polyimide, PEEK and a fluoropolymer such as PTFE. The heat shrink film is preferably a preferential heat shrink film arranged to shrink preferentially in one direction. In this way, the preferential heat shrink direction may be aligned to the wrapping direction of the thin film heater and heated so as to contract in the wrapping direction, securing the thin film heater to the heating chamber. For example the heat shrink film may be polyimide 208× tape manufactured by Dunstone. The heat shrink film may be in the form of an initially planar layer, i.e. a piece of heat tape arranged to be wrapped around the heating chamber or it may be in the form of a tube arranged to be passed around (i.e. sleeved on) a heating chamber and heated to shrink it to the surface of a heating chamber.

Preferably the heat shrink film is attached using an adhesive provided on the surface of the flexible electrically insulating backing film which supports the heating element. The adhesive may be for example a silicon adhesive. The adhesive provides a straightforward means of reliably securing both the heating element and the heat shrink film to the backing film. The flexible electrically insulating backing film may comprise a layer of adhesive, for example it may be polyimide film with a layer of Si adhesive. The heating element may be attached by subsequent heating of the flexible electrically insulating backing film, adhesive layer and positioned heating element to bond the heating element to the surface using the adhesive. The subsequent heating may be a heating step used to shrink the heat shrink film to attach the thin film heater to a heating chamber.

Preferably the heat shrink film is attached so as to enclose the heater track between the backing film and the heat shrink film, leaving the contact legs exposed. In this way the heater track is electrically insulated between the electrically insulating backing film and the heat shrink film whilst the contact legs are exposed such that they can be connected to a power source. The contact legs may be sufficiently long to allow direct connection to a power source when the thin film heater is employed in the device. For example the length of the contact legs may be substantially equal or greater than one or both of the dimensions defining the heating area. The circuitous path may be configured to leave a vacant region within the heating area.

In some examples, the heater assembly further comprises a layer of graphite arranged against a surface of the thin film heater assembly, the layer of graphite at least partially overlapping with the heating element track and the temperature sensing element. For example, the layer of graphite may be arranged against the backing film or against the heat shrink film. In this way, the graphite layer acts to spread the heat generated by the heating element uniformly within the plane of the thin film heater assembly during use. In particular, the high thermal conductivity of graphite means that heat is spread rapidly laterally within the thin film heater assembly to prevent localised hot spots, for example in regions close to the heating element. By overlapping the graphite layer with the heating element, heat is rapidly conducted to the graphite layer and subsequently spread over an area corresponding to the graphite layer, including the temperature sensing element.

Preferably the heater assembly further comprises an electrically insulating sealing layer arranged around an outer surface of the heater assembly. In particular the sealing layer is wrapped around the flexible thin film heater to seal the flexible thin film heater against the heating chamber. Preferably the sealing layer is positioned over a heat shrink layer. The thin film heater may be sealed to prevent the release of one or more by-products during heating. In some examples, the layers of the thin film heater are configured to provide increased heat transfer from the heating element in one direction. For example the thickness and/or material properties of one or more of: the flexible electrically insulating backing film, the second flexible electrically insulating film and the one or more sealing layers are selected to provide an increased heat transfer in a direction corresponding to towards the heating chamber during use. For example the insulating backing film may have an increased thermal conductivity relative to the heat shrink film layer and/or a sealing layer. In this way the transfer of heat to the heating chamber is promoted and transfer of heat away from the heating chamber is reduced to mitigate heat loss. Preferably the side of the thin film heater arranged to contact the heating chamber is configured to have a higher thermal conductivity than the opposite, outer side. Preferably the sealing layer has a lower thermal conductivity than the backing film.

In another aspect of the invention there is provided an aerosol generating device comprising a heater assembly as defined above or as defined in the appended claims. In particular the aerosol generating device may be arranged to receive a consumable comprising a material to be heated in the heating chamber and further comprising a power supply and control circuitry for controlling the heating element to heat the consumable to produce an inhalable vapour. Such a device can provide more reliable heating of a consumable due to the more accurate control of the heating temperature provided by the heater assembly.

In another aspect of the invention there is provided a method of fabricating a heater assembly comprising: providing a tubular heating chamber; providing a temperature sensor having a temperature sensing element; providing a flexible thin film heater comprising a heating element track supported on a surface of a flexible electrically insulating backing film; wrapping the thin film heater around an outer surface of the heating chamber with the backing film toward the heating chamber; wherein the method comprises positioning the temperature sensing element such that it overlaps with a portion of the heating element track.

Preferably the method further comprises positioning the temperature sensor against the outer surface of the heating chamber.

Preferably the temperature sensor is fixed to the outer surface of the heating chamber with an adhesive. The temperature sensor is preferably fixed before wrapping.

Preferably the method comprises wrapping the thin film heater around the outer surface of the heating chamber such that the temperature sensing element is positioned between the outer surface of the heater chamber and a portion of the heating element track.

Preferably the temperature sensing element is positioned within an indentation provided in an outer surface of the heating chamber.

In a further aspect of the invention there is provided there is provided a heater assembly for an aerosol generating device comprising: a tubular heating chamber; a flexible thin film heater comprising a heating element track supported on a surface of a flexible electrically insulating backing film; wherein the flexible thin film heater is wrapped around an outer surface of the heating chamber with the backing film toward the heating chamber; and a temperature sensor comprising a temperature sensing element, wherein the temperature sensing element is positioned so as to overlap with a portion of heating element track. This aspect of the invention may comprise one or more of the subsidiary features described above with respect to the first aspect of the invention.

BRIEF DESCRIPTION OF THE DRAWINGS

Embodiments of the invention will now be described, by way of example only, with reference to the accompanying drawings, in which.

DETAILED DESCRIPTION

Figure 1:
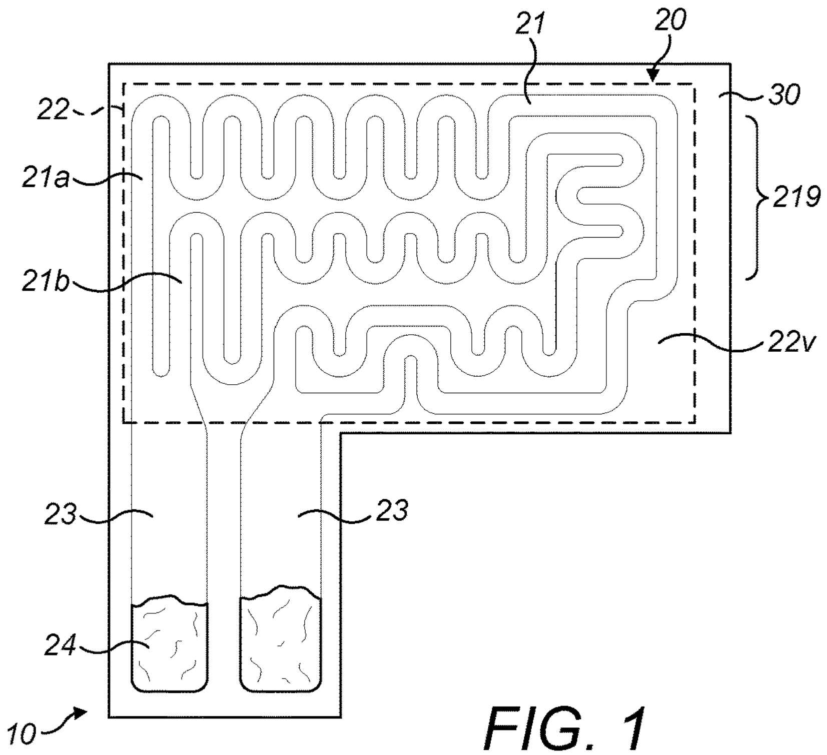
FIG. 1 schematically illustrates a thin film heater for use in a heater assembly according to the present invention.
Figure 2:
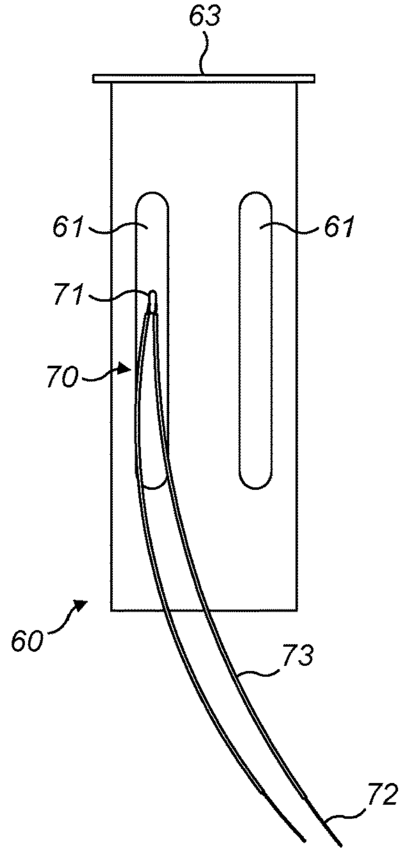
FIG. 2 schematically illustrates a heating chamber and temperature sensor for use in a heater assembly according to the present invention.
Figure 3:
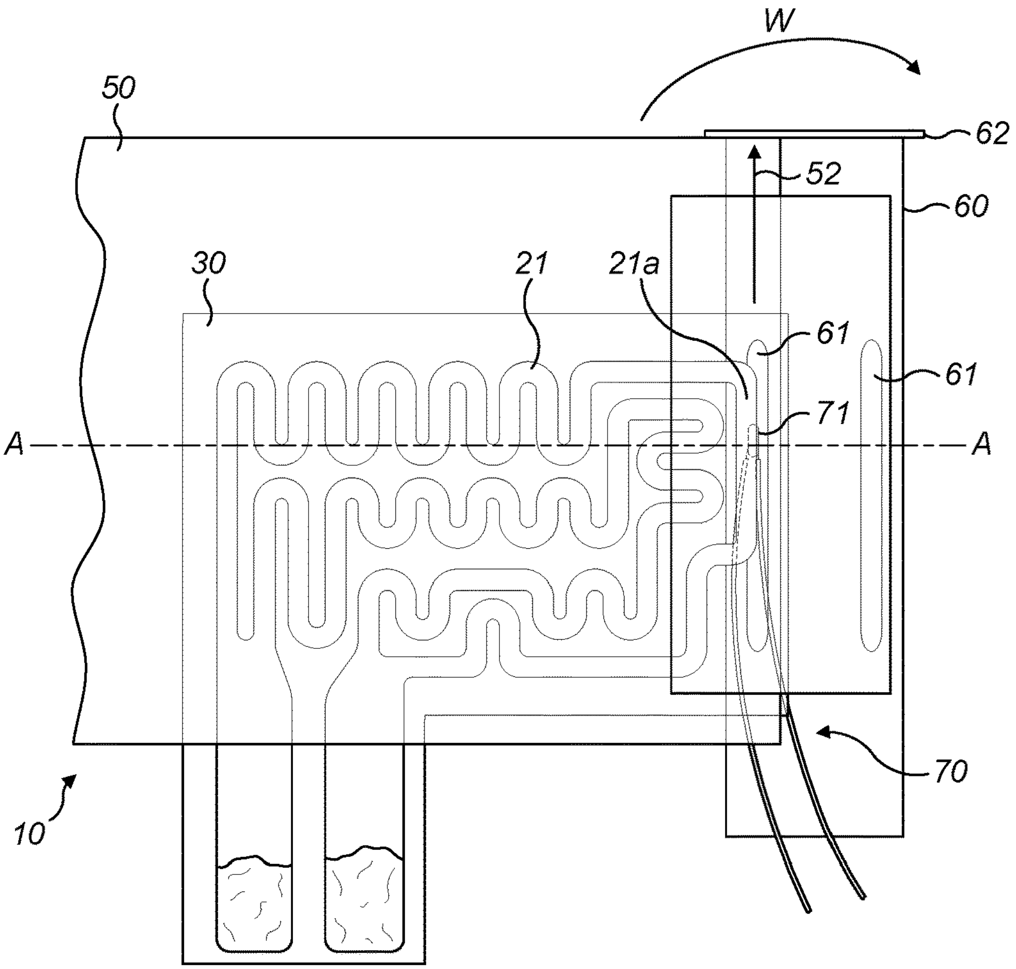
FIG. 3 schematically illustrates an assembly step for assembling a heater assembly according to the present invention.
Figure 4:
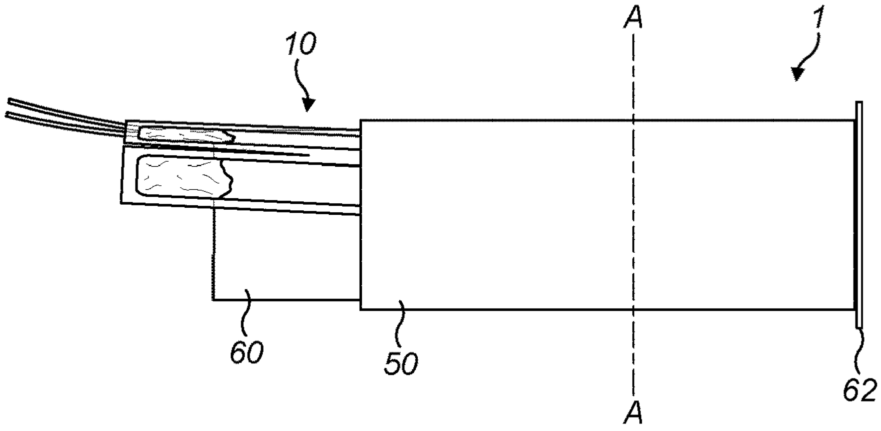
FIG. 4 schematically illustrates a heater assembly according to the present invention.

FIG. 1 schematically illustrates a flexible thin film heater 10 for use in a heater assembly 1 for an aerosol generating device according to the present invention. The thin film heater comprises a heating element 20 including a heating element track 21 supported on the surface of a flexible electrically insulating backing film 30. The heater assembly according to the present invention further includes a tubular heating chamber 60 and a temperature sensor 70 comprising a temperature sensing element 71, as shown in FIG. 2. The flexible thin film heater 10 is initially planar and wrapped around an outer surface of the heating chamber 60 with the backing film 30 towards the heating chamber 60, in wrapping direction w as shown in FIG. 3, to form a heater assembly 1 as shown in FIG. 4. As shown in the cross-section through the heater assembly 1 of FIG. 5, the temperature sensing element 71 is positioned so as to overlap with a portion 21*a* of the heating element track 21.

Because the temperature sensor is arranged such that the temperature sensing element 71 overlaps with a portion 21*a* of the heating element track 21, the temperature sensing element 71 provides a more accurate reading of the temperature of the heater track 21 itself, given the proximity of the temperature sensing element to a portion 21*a* of the heater track 21 in this arrangement. Since, as will be described, the heater track 21 is substantially uniform so as to provide consistent resistive heating at all points of the heater track 21, the fact that the temperature sensing element 71 is positioned adjacent to a portion 21*a* of the heating element track 21 along a direction r corresponding to a radial direction of the tubular heating chamber 60, the temperature sensing element 71 is positioned as close as possible to the heater track 21 in order to provide an accurate measurement of the true heating temperature. This provides advantages in comparison to known devices in which the temperature sensor 70 is generally arranged so as to try to sense the temperature of the heater chamber 60 and therefore may not provide an accurate reading of the heater track 21.

The present invention therefore allows more reliable feedback to be provided to the control circuitry of an aerosol generating device in order to more precisely control the true temperature of the heater track 21. Since the distribution of the heater track 21 over the area of the thin film heater means that the temperature may not be completely uniform over the area of the thin film heater 10, by measuring the heater track 21 itself, the heater assembly 1 can prevent hot spots from forming since the temperature sensor 70 measures the hottest portion of the thin film heater 10, in the vicinity of the heater track 21. The temperature control during heating is also more accurate and in particular unwanted large temperature discrepancies compared to temperature thresholds or set points can be more easily avoided.

Figure 5:
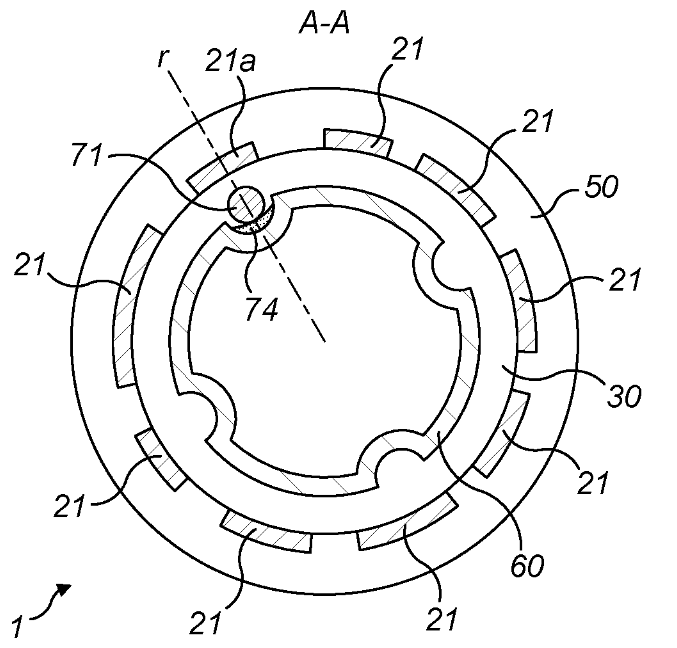
FIG. 5 schematically illustrates a cross-section view through the heater assembly according to the present invention of FIG. 4.

In the examples of FIGS. 1 to 5, the temperature sensor 70 is attached to an outer surface of the heating chamber 60, as shown in FIG. 2. More particularly, the temperature sensor 70 may be attached to the outer surface of the heating chamber 60 using an adhesive 74, as shown in FIG. 5, such as an inorganic glue or adhesive (e.g. a silicone or ceramic glue). The adhesive 74 may be used to attach the temperature sensing element 71 directly to the outer surface of the heating chamber 60. The temperature sensing element 71 is preferably positioned within an indentation 61 provided in the outer surface of the heating chamber 60. The indentation 61 extend radially inward into the inner volume of the heating chamber as shown in FIG. 5 and act to grip a consumable received within the chamber 60 in order to restrict the depth of insertion of a consumable to a correct position along the heating chamber 60 and to assist with efficiently transferring heat from the chamber to the consumable in order to heat a material within the consumable for vaporisation. By positioning the temperature sensing element 71 within an indentation 61 and such that it is overlapped by a portion 21*a* of the heater track 21, the temperature sensing element provides both an accurate measurement of the internal heating temperature of the chamber 60 and also of the temperature of the heater track 21 itself. It therefore allows both close monitoring of the heating temperature applied to a consumable and close monitoring of the temperature of the heater track 21 to prevent hot spots occurring which can lead to potential degradation of the thin film layers 30, 50.

As shown in FIG. 3, the thin film heater 10 is attached over the temperature sensor 70 such that the temperature sensing element 71 is held between the outer surface of the heating chamber 60, preferably within the indentation 61, and a portion 21*a* of the heating element track 21. In other words, the temperature sensing element 21 is positioned between a portion 21*a* of the heating element track 21 and an outer surface of the heating chamber 60 in the radial direction are of the tubular heating chamber (i.e. in a direction normal to the heater chamber surface), the temperature sensing element 21 separated from the heating track 21 only by the backing film 30.

As shown in FIG. 3, the thin film heater 10 is first attached at one edge of the thin film heater 10 to ensure the portion of the heater track 21 overlies the temperature sensing element 71 and then the thin film heater 10 is wrapped, in a direction w in FIG. 3, around the circumference of the heating chamber 60 and secured in place to form the assembled heater assembly 1 shown in FIG. 4. The temperature sensing element 71, as explained, thus lies adjacent to a portion 21*a* of the heater track 21 in the radial direction, separated by the backing film 30.

The thin film heater 10 may be attached to the heating chamber 60 in several different ways. Preferably, a heat shrink film 50 is used, as shown in FIG. 3, to wrap around both the thin film heater 10 and heating chamber 60 prior to being heated to contract the heat shrink film 50 securing the thin film heater 10 against the heating chamber as shown in FIG. 4. Further details of this process are explained below below.

Further examples of the heater assembly 1 according to the present invention together and a method of assembling the heater assembly 1 will now be described with reference to the figures.

As shown in FIG. 1, the first step in assembling the heater assembly 1 involves providing a thin film heater 10 comprising a heating element 20 supported on a surface of a flexible dielectric backing film 30. This may be achieved in a number of different ways. In particular, the heating element 20 may be etched from a thin metal sheet of around 50 µm, for example a sheet of stainless steel such as 18SR or SUS304, although other materials and heater thicknesses may be selected depending on the application. The specific metal and thickness of the metal sheet are selected such that the resulting heating element 20 is flexible so that it can deform with the supporting flexible thin film 30 in order to conform to the shape of a surface to be heated. The metal sheet may be deposited initially on the surface flexible dielectric backing film 30, before being etched whilst supported on the film to form the heater track 21 pattern. Alternatively, the heating element 20 may be etched from a metal sheet independently of the flexible dielectric backing film. For example a free standing metal foil may be chemically etched from both sides in order to provide one or more connected heating elements 20 which are subsequently detached and positioned on the surface of a dielectric backing film 30.

The heating element is preferably a planar heating element 20 including a heater track 21 which follows a circuitous path over a heating area 22 within the plane of the heating element 20. The heating element has two contact legs 23 allowing connection to a power source, the contact legs 23 extending away from the heater track 21 in the plane of the heating element 20. The heater track is preferably shaped so as to provide substantially uniform heating over the heating area 22. In particular, the heater track is shaped such that it contains no sharp corners and has a uniform thickness and width, with the gaps between neighbouring parts of the heater track 22 being substantially constant to minimise increased heating at specific points within the heating area 22 as much as possible. The heater track 21 in the example of FIG. 1 follows a serpentine path over the heater area 22 and is split into two parallel track paths 21*a* and 21*b*, each connected to both contact legs 23. The heater legs 23 may be soldered at a connection point 24 on each contact leg 23 to allow for the connection of the heater to a PCB and power source.

The flexible dielectric backing film 30 must have suitable properties to provide a flexible substrate to support and electrically insulate the heating element 20. Appropriate materials include polyimide, PEEK and fluoropolymers such as PTFE. In this case the heating element comprises a heater track pattern 21 etched from a layer of 50 µm stainless steel 18SR which is supported on a single sided polyimide/Si adhesive film comprising a 25 µm polyimide film with a 37 µm silicon adhesive layer. The heating element 20 is supported on the adhesive to allow the heating element to be attached to the backing film. The thin film heater 10 of FIG. 1A may be prepared in advance and stored with a release layer which is attached to the adhesive surface supporting the heating element 20 to preserve the adhesive layer until it is ready for use. The release layer may be provided for example by polyester or similar material. The release layer can then be peeled off to uncover the sticky adhesive layers supporting the heating element in order to proceed to the next assembly steps.

The temperature sensor 70 is then attached to the heating chamber 60 such as that shown in FIG. 2. The heating chamber 60 comprises a tubular heat conductive shell with an open end 63 for receiving a consumable to be heated. The heating chamber preferably comprises a metal such as stainless steel and has a tubular side wall thickness of 0.1 mm or less. As described, the heating chamber 60 preferably further comprises a circumferential lip 62 around the open end for positioning the chamber 60 in a device and a series of lengthwise indentations 61 arranged around the circumference of the heating chamber 60 which act to grip a consumable received in the chamber 60.

The temperature sensor 70 is preferably a thermistor with a temperature sensing element 71 in the form of a temperature sensing head or bead 71 and connections 72 for connection to a PCB such that the sensed temperature may be used within the control circuitry of an aerosol generating device incorporating the heater assembly 1 in order to control the heating temperature.

In the example of FIGS. 2 to 5, the thermistor 70 is fixed directly onto the outer surface of the heating chamber 60, such that the temperature sensing element lies within an indentation 61 using an adhesive 74 preferably an inorganic adhesive such as silicone or ceramic glue. The temperature sensing element 71 is preferably arranged centrally along the length of the indentation as shown in FIG. 2.

As shown in FIG. 5, the next step in this exemplary method of fabricating the heater assembly 1 is the application of a layer of heat shrink film 50 directly onto the surface of the dielectric backing film 30 of the thin film heater in so as to at least partially enclose the heater track 21 of the heating element 20 between the heat shrink film 50 and the backing film 30. The heat shrink film 50 can be attached with an adhesive directly onto the surface of the heater element 20 so as to enclose the heating area 20 between the backing film 30 and the heat shrink 50. In particular, the heater track 21 is insulated within a sealed envelope formed by the flexible backing film 30 and the heat shrink 50, while the contact legs 23 remain exposed to allow connection to a power source when employed in an aerosol generating device.

The heat shrink 50 is larger than the backing film 30 and heating element 20 such that it extends beyond the heating element 20 by predetermined distance in two orthogonal directions 51, 52. This alignment of the heat shrink 50 relative to the heating element 20 allows for the later alignment of the heating area 20 relative to the heating chamber 60. Therefore, careful control of the size of these extending portions of the heat shrink 51, 52 at this stage allows for the heater assembly 100 to be attached to a heating chamber 60 in a straightforward manner to provide precise alignment. The relative alignment of the heat shrink 50 and thin film heater 10 can be achieved in a number of different ways. The heat shrink 50 may be pre-cut to correct size and then aligned to an edge of the flexible dielectric backing film 30 to provide the correct predetermined distances 51, 52 of the extending portions. Alternatively, an alignment apparatus may be used to achieve this precise alignment.

In particular, a series of corresponding alignment holes (not pictured) may be provided in both the backing film 30 and heat shrink 50 which can be used for the relative alignment of the backing film 30 and heat shrink 50. The alignment holes are arranged such that when the holes of the backing film 30 are brought into alignment with the alignment holes of the heat shrink 50, the heat shrink 50 is positioned at precisely the correct position relative to the thin film heater 10 such that the heat shrink 50 extends beyond the heating area 22 by the correct lengths 51, 52 to allow for precise alignment of the heating element 20 relative to the heating chamber 60 when attached. The heat shrink 50 is then aligned relative to the thin film heater 10 using a positioning fixture comprising a supporting surface with upstanding alignment pins which correspond in their relative displacement to the positions of the alignment holes on the backing film 30 and the heat shrink 50. The heating element 20 on the backing film 30 and the heat shrink 50 can then be positioned on the surface of the alignment fixture such that the alignment pins extend through the backing film alignment holes, ensuring that the heat shrink is aligned precisely relative to the heating element 20 and backing film 30.

Figure 6:
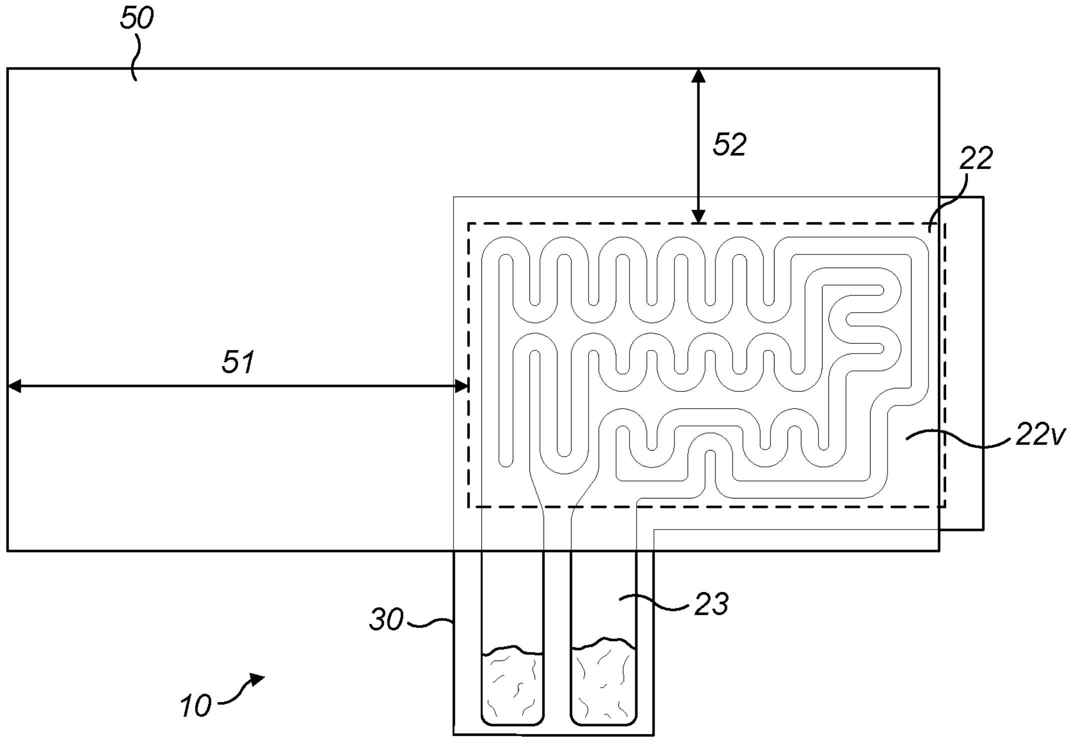
FIG. 6 schematically illustrates an assembly step for assembling a heater assembly according to the present invention.

The heat shrink 50 extends beyond the heating area 20 in a direction opposite to the contact legs 23 to provide an alignment region 52 of the heat shrink 50, shown in FIG. 6. This alignment region 52 can be aligned with the top edge 62 of a heating chamber 60 such that the heating area 20 is positioned at a position along the length of the heating chamber corresponding to the predetermined length 52 of the alignment region from the top edge of the heater track 21. In this way, the heater element 20 can be provided at a correct position along the heating chamber 60. The heat shrink 50 also has an attachment region 51 which extends past the heater track 21 and backing film 30 in a direction perpendicular to the direction of extension of the contact legs 23 to provide an attachment region 51.

The direction of extension of the attachment region 51 may be referred to as the "wrapping direction" since this portion of the heat shrink 50 allows for it to be wrapped around a tubular heating chamber 60 and subsequently heat shrunk to provide the required tight connection. Similarly, the direction opposite to the heater legs 23 in the direction that the alignment region 52 extends from the heating element 20 may be referred to as the upward or alignment direction which corresponds with the elongate axis of the heating chamber 60, directed towards the top open end. These extension distances 51, 52 may be configured by cutting the heat shrink 50 to the correct dimensions either before or after attaching to the surface of the dielectric backing film 30.

Figure 7:
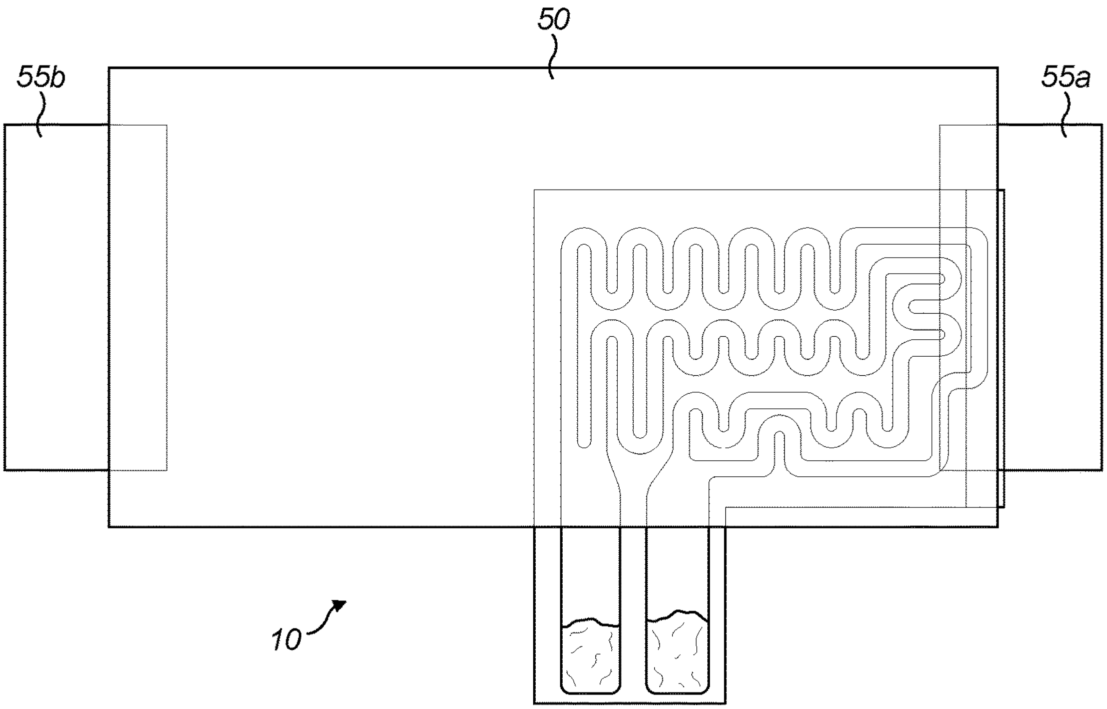
FIG. 7 schematically illustrates an assembly step for assembling a heater assembly according to the present invention.

As shown in FIG. 7, the next step is to attach two pieces of adhesive tape 55*a*, 55*b* to attach the thin film heater 10 to the heating chamber 60 at the correct position such that a portion 21*a* of the heater track overlaps with the position of the temperature sensing element 71. The adhesive tape 55, 55*b* is attached to the surface of the heat shrink film 50, on the opposing side to the thin film heater 10. In this way, the adhesive side of the tape 55*a*, 55*b*, is correctly aligned so as to be used to attach the thin film heater with the backing film 30 against the heating chamber 60. The sticky tape 55*a*, 55*b* may be provided by pieces of polyimide adhesive tape, for example 0.5 inch polyimide tape with 12.7 micrometre polyimide and 12.7 micrometre silicon adhesive. The sticky attachment tape 55*a*, 35*b* is positioned along each edge of the heat shrink at the extremities in the wrapping direction.

As shown in FIG. 3, the thin film heater 10 may then be attached to the heating chamber 60 by aligning the top edge 53 of the heat shrink 50 with the top edge 62 of the heating chamber 60 and initially attaching the thin film heater 10 with the first piece of adhesive tape 55*a*. Given the distance 52 of the alignment region has been carefully selected this alignment step allows for the heating area 22 to be placed at the correct position along the heating chamber 60. This can also assist in ensuring that the portion of the heater track 21*a* correctly overlies the temperature sensing element 71. Certain consumables will contain a charge of aerosol generating substance at a particular position so it is important that the correct portion of the heater chamber is heated to efficiently release the vapour from the consumable.

During initial attachment of the thin film heater 10 to the heater chamber 60, the thin film heater is positioned with the backing film 30 against the temperature sensor 70 such that a portion 21*a* of the heater track 21 is placed against the temperature sensing element 21*a*, separated by the backing film 30. The temperature sensing element 71 is preferably aligned with a portion of the heater track which extends in a direction corresponding to the length of the heater chamber 60. That is, as shown in FIG. 1, as portion 21*a* of the heater track is preferably selected which extends over a substantial length in a direction perpendicular to the wrapping direction, i.e. in a direction that is parallel with the axis of the heating chamber 60 when attached. This ensures that any small variation in the height of the sensing element (the position along the length of the heater chamber) has no effect on the measured temperature as the portion 21*a* of the heater track extends over a substantial length in this direction.

The circumference of the heating chamber 60 preferably closely matches the width of the heating element 20 (the length in a direction perpendicular to the direction of extension of the contact legs 23) such that the heating element 20 provides one complete circumferential loop around the chamber 60. In other examples the heater element 20 might be sized to wrap more than once around the circumference of the heating chamber 60, i.e. the heating element 20 may be sized so as to provide an integral number of circumferential loops around the heating chamber so as not to produce any variation in the heating temperature around the circumference of the heating chamber.

Once attached with first adhesive tape portion 55*a*, the thin film heater 10 is then rolled around the heating chamber 60 with the extended attachment portion 51 of the heat shrink 50 wrapping circumferentially around the chamber 60 to cover the heating element 20 again before attaching with the second piece of attachment tape 55*b* to provide the attached heater assembly 1 (including the heater element 20, backing film 30, heat shrink film 50, thermistor 70 and heater chamber 60) shown in FIGS. 4 and 5. Since the length of the attachment region 51 is approximately the same as the length of the heating area 22 (and the circumference of the heating chamber 60), the attachment portion 51 wraps around to cover the heating area 22 once, such that the heater element is insulated by two layers of heat shrink film in the attached heater assembly 1 in FIGS. 4 and 5 (these are shown together as single layer 50 in FIG. 5). The attachment region 51 may be sized to provide more than one additional covering of the heating element 20. For example the attachment region 51 may extend beyond the heating element by a distance corresponding to an integer multiple of the outer circumference of the heating chamber 60.

As can be seen in FIG. 4 the temperature sensor connections 72 and the heater leg 23 are positioned such that they are aligned following this step for ease of connection to the PCB. The attached heater assembly 1 is then heated to shrink the heat shrink 50 tight against the heating chamber 60 as shown in FIG. 2G. For example, the heater assembly 1 can be heated in an oven at around 210° C. for ten minutes to shrink the film, although the time and temperature can be adapted for other varieties of heat shrink. This process allows large numbers of units to be heat treated in a small oven at the same time. This is the only required heating step which can both simultaneously seal the thin film heater to the heating chamber and bond the backing film to the heat shrink.

Finally, although not essential, a final layer of dielectric film may be added around the outside of the heating element to complete the heating assembly 1. This final dielectric layer may be for example a further layer of adhesive polyimide such as 1 inch polyimide tape with 25 micrometre polyimide and 37 micrometres silicon adhesive. This outer layer of dielectric film provides a further layer of insulation and further secures the attachment of the thin film heater to the heating chamber 60. The thickness and/or material of the backing film 30, heat shrink 50 and final insulating layer may be selected to enhance heat transfer to the heating chamber, for example with lower thermal conductivity layers provided outside the heating element (i.e. for the heat shrink 50 and insulating layer 36 in this example) and a higher thermal conductivity layer provided as the backing film.

Once the outer insulating layer of dielectric film has been applied (if used), the heater assembly 1 may again be heated. This second heating step allows for further outgassing of the outer layer of dielectric film, as well as the other layers. For example, in the second heating stage, the heating temperature may be taken up to a higher temperature than the heat shrinking stage, closer to the operating temperature of the device. This allows for further outgassing, for example of the Si adhesive that may not have taken place during the heat shrinking step at the lower temperatures. It is also beneficial to expose the heat shrink to a temperature closer to the operating temperature prior to heating during first use of the device.

Figure 8:
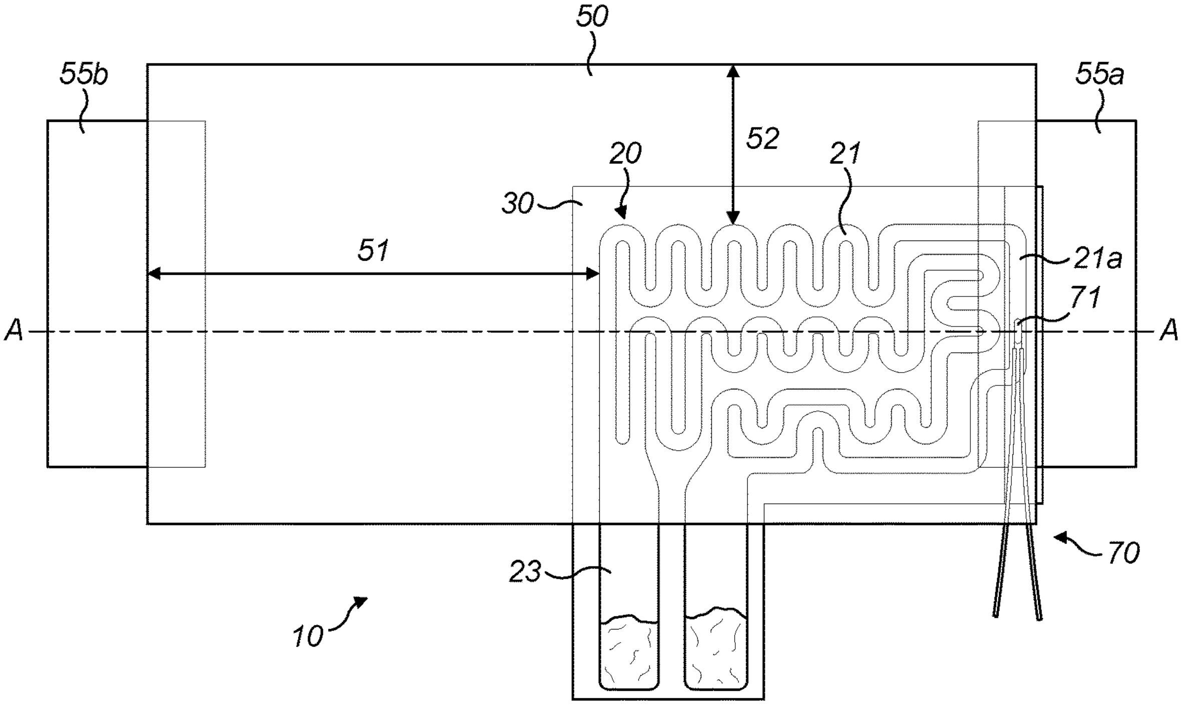
FIG. 8 schematically illustrates an alternative assembly step for assembling a heater assembly according to the present invention.
Figure 9:
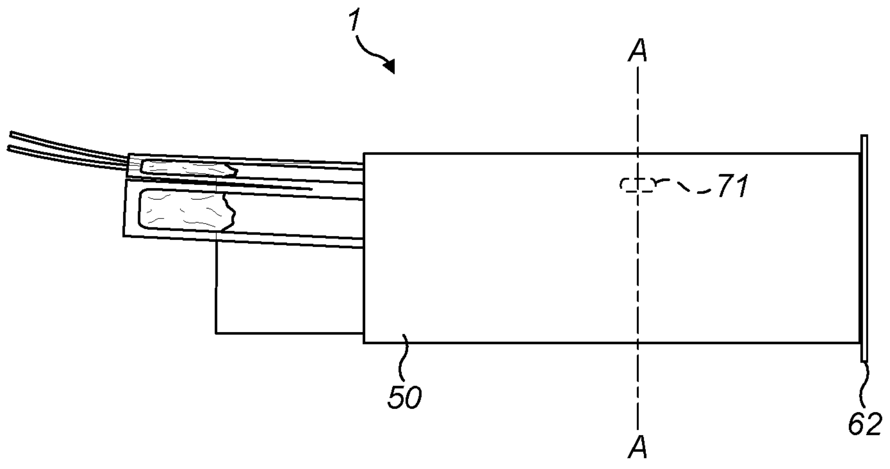
FIG. 9 schematically illustrates a heater assembly according to the present invention.
Figure 10:
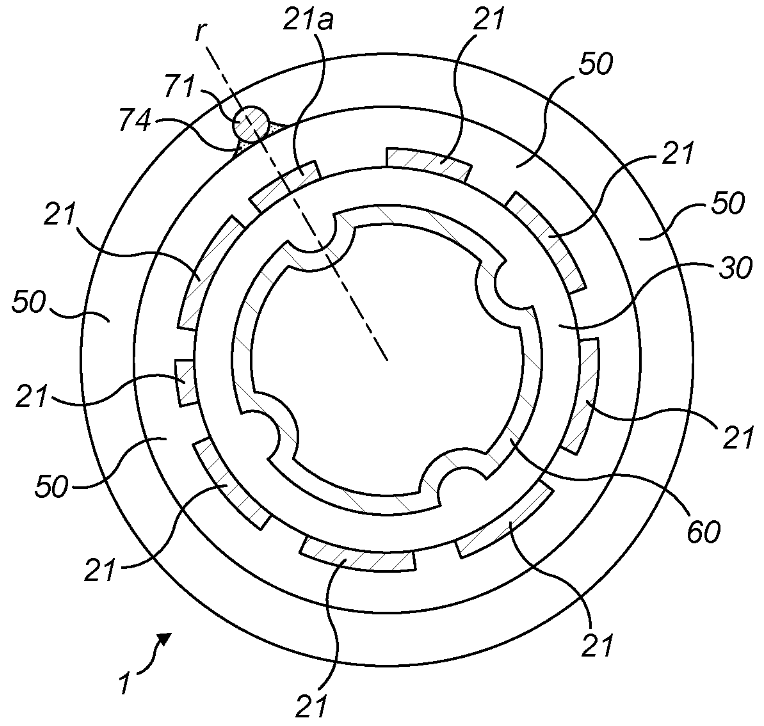
FIG. 10 schematically illustrates a cross-section view through the heater assembly according to the present invention of FIG. 9.

FIGS. 8 to 10 schematically illustrate an alternative example of the heater assembly 1 according to the present invention. In the examples of FIGS. 1 to 7, the temperature sensor 70 was attached to the outer surface of the heating chamber 60, prior to attaching the thin film heater 10 around the heating chamber 60 to cover the temperature sensor 70, thus ensuring that the temperature sensing element 71 is overlapped by a portion 21*a* of the heating element track 20. The examples of FIGS. 8 to 10 also achieve the same requirement of ensuring the temperature sensing element overlaps with a portion 21*a* of the heater track 21 in a radial direction of the assembled heater assembly 1 but in this case the temperature sensing element 71 is positioned outside of the heating track portion 21*a* in a radial direction r. That is, the sensor element 71 remains adjacent to a portion 21*a* of the heater track 21 along a normal to a surface of the heating chamber (along the radial direction r). However, in this example the temperature sensor 70 is not attached to the outer surface of the heating chamber 60 but to the heat shrink film 50.

As shown in FIG. 8, the thin film heater 10 is first assembled as explained above with reference to FIGS. 1, 6 and 7. In particular, the planar heating element 20, including a heater track 21, is provided on the surface of a flexible electrically insulating backing film 30. A heat shrink film 50 is positioned on the heater track 21 and backing film such that the heater track is enclosed between the flexible electrically insulating backing film 30 and the heat shrink film 50, leaving the legs 23 of the heating element 20 exposed for connection to a power source.

This arrangement differs in that the temperature sensor 70 is then attached to the surface of the heat shrink 50 such that the temperature sensing element 71 overlaps with a portion 21*a* of the heater track 21. In other words, the temperature sensing element 71 is positioned on top of a portion 21*a* of the heater track 21 such that it lies against the heater track 21, separated by the heat shrink 50. As with all examples of the invention, the temperature sensing element 71 may be placed at any point on the heater track 21, given that the heating temperature across the heater track 21 is substantially uniform.

However the temperature sensing element is preferably positioned along a portion 21*a* of the heater track 21 which extends lengthwise, i.e. in a direction which aligns with the axis of the tubular heating chamber 60 when attached. Pieces of sticky tape 55A and 55B are attached to the edges of the heat shrink, as described above. In particular the tape is attached to the assembled thin film heater 10 and heat shrink 50 at the extremities in the wrapping direction. The first piece of sticky tape 55*a* (used to first attach the thin film heater 10 to the heating chamber 60) may be used to attach the temperature sensing element in position, overlying a portion 21*a* of the heater track 21. In particular, the temperature sensor may be positioned on the surface of the heat shrink 50 and a piece of tape 55A positioned over the top of it to both secure it in place and for use in the initial attachment of the thin film heater 10.

As explained above with respect to FIGS. 3 and 4, the thin film heater 10 with the attached temperature sensor 70 is then wrapped around the outer surface of the heating chamber by first attaching a first edge of the thin film heater to the outer surface of the heating chamber with tape 55*a* and wrapping the thin film heater 10 and extending portion 51 of the heat shrink 50 around the outer surface of the heating chamber before attaching the second edge with the second piece of tape 55B. Again, the temperature sensing element 71 may be aligned at a specific point on the heater chamber surface, for example at an indentation 61 before the thin film heater 10 and heat shrink 50 is wrapped around the surface of the heating chamber to attach the thin film heater 10. The extending portion of the heat shrink 51 wraps over the top of the temperature sensor 70 such that the temperature sensor 70 is positioned between two layers of heat shrink 50, as shown in FIG. 10. Of course in practice, the layers of the heat shrink are continuous and spiral out to overlap itself but these are illustrated schematically in FIG. 10 as two separate layers.

FIG. 10 shows a cross section through the assembled heater assembly 1 of FIG. 9 through section A-A marked in FIG. 9 and FIG. 8 to show the intersection with the temperature sensor element 71 and the heater track 21. As shown in FIG. 10, the temperature sensing element 71 is positioned between two layers of heat shrink 50 (formed by the two circumferential wraps of the piece of heat shrink 50) outside of a portion 21*a* of the heater track 21 such that the sensing element 71 and portion 21*a* of the heater track 21 are aligned along a radial direction of the heater assembly 1. As described above with the previous embodiments, this assembly allows for an accurate reading of the temperature provided by the heating element 20 to prevent the formation of hot spots.

The invention claimed is:

1. A heater assembly for an aerosol generating device comprising:

a tubular heating chamber;

a flexible thin film heater comprising a heating element track supported on a surface of a flexible electrically insulating backing film; wherein the flexible thin film heater is wrapped around an outer surface of the heating chamber with the backing film toward the heating chamber; and a temperature sensor comprising a temperature sensing element configured to sense a local temperature, wherein the temperature sensing element is positioned so as to overlap with a portion of the heating element track and the temperature sensor is separated from the portion of the heating element track by the backing film.

2. The heater assembly of claim 1 wherein the temperature sensing element comprises a temperature sensing head positioned adjacent to a point on the heating element track.

3. The heater assembly of claim 1, wherein the temperature sensing element is held between the outer surface of the heating chamber and a portion of the heating element track.

4. The heater assembly of claim 3 wherein the temperature sensing element is held in direct contact with the outer surface of the heating chamber.

5. The heater assembly of claim 3, wherein the heating chamber comprises one or more indentations on the outer surface of the heating chamber and the temperature sensing element is positioned within one of the one or more indentations.

6. The heater assembly of claim 1, wherein the temperature sensor is fixed to the outer surface of the heating chamber with an adhesive.

7. The heater assembly of claim 1, wherein the thin film heater further comprises two contact legs for connection to a power source, the two contact legs extending away from the heater track along the length of the heating chamber; and the temperature sensor comprises a temperature sensing element and elongated electrical connections, the elongated electrical connections oriented substantially in the same direction as the two contact legs of the heating element.

8. The heater assembly of claim 1, wherein the flexible electrically insulating backing film comprises Polyimide or PTFE.

9. The heater assembly of claim 1, wherein the flexible thin film heater further comprises a heat shrink layer positioned on the electrically insulating backing film so as to at least partially enclose the heating element track between the electrically insulating backing film and the heat shrink layer.

10. An aerosol generating device comprising a heater assembly of claim 1.

11. A method of fabricating a heater assembly comprising:

providing a tubular heating chamber;

providing a temperature sensor having a temperature sensing element configured to sense a local temperature;

providing a flexible thin film heater comprising a heating element track supported on a surface of a flexible electrically insulating backing film;

wrapping the thin film heater around an outer surface of the heating chamber with the backing film toward the heating chamber; and positioning the temperature sensing element such that the temperature sensing element overlaps with a portion of the heating element track, wherein the temperature sensor is separated from the portion of the heating element track by the backing film.

12. The method of claim 11, wherein the method comprises positioning the temperature sensor against the outer surface of the tubular heating chamber.

13. The method of claim 12 wherein the temperature sensing element is positioned within an indentation provided in an outer surface of the heating chamber.

14. The method of claim 12 further comprising:

fixing the temperature sensor to the outer surface of the heating chamber with an adhesive.

* * * * *